(12) United States Patent
Gutta et al.

(10) Patent No.: US 7,418,192 B2
(45) Date of Patent: Aug. 26, 2008

(54) DYNAMIC KEY FRAME GENERATION AND USAGE

(75) Inventors: Srinivas Gutta, Buchanan, NY (US); Kaushal Kurapati, Yorktown Heights, NY (US); Antonio Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1592 days.

(21) Appl. No.: 09/805,748

(22) Filed: Mar. 13, 2001

(65) Prior Publication Data

US 2002/0130976 A1 Sep. 19, 2002

(51) Int. Cl.
*H04N 5/91* (2006.01)
(52) U.S. Cl. .......................... 386/69; 348/726
(58) Field of Classification Search ............. 386/69, 386/47, 52, 63, 64, 92, 109, 110, 121
See application file for complete search history.

(56) References Cited

U.S. PATENT DOCUMENTS

| | | | |
|---|---|---|---|
| 6,061,056 A | | 5/2000 | Menard et al. |
| 6,137,544 A | * | 10/2000 | Dimitrova et al. ............. 386/69 |
| 6,219,837 B1 | * | 4/2001 | Yeo et al. ...................... 725/38 |
| 6,473,095 B1 | * | 10/2002 | Martino et al. ............... 348/700 |
| 6,567,985 B1 | * | 5/2003 | Ishii ............................ 725/115 |

FOREIGN PATENT DOCUMENTS

| | | |
|---|---|---|
| EP | 0726574 A2 | 8/1996 |
| JP | 10243352 | 9/1998 |
| WO | 9940587 | 8/1999 |
| WO | 0005884 | 2/2000 |
| WO | 0008850 | 2/2000 |

* cited by examiner

*Primary Examiner*—John W. Miller
*Assistant Examiner*—James A Fletcher

(57) ABSTRACT

A dynamic method and system for processing video source frames (e.g., a television movie) with a video processing system (VPS) that includes a processor, a memory structure, input devices, and an output display. The video source frames, which are received by the VPS from a video source, are executed by the processor. While the video source frames are being executed, a subset of the frames, called key frames, are extracted from the video source frames and stored in the memory structure. The extracting of the key frames is implemented in accordance with a frame extraction algorithm. The extracting is terminated prior to completion of execution of the video source frames. Following termination of extracting, the key frames are reviewed by a user with the output display to determine whether to watch the remainder of the video source frames. The key frames are erased after being reviewed.

60 Claims, 2 Drawing Sheets

DYNAMIC KEY FRAME GENERATION AND USAGE

BACKGROUND OF THE INVENTION

1. Technical Field

The present invention relates generally to a method and system for processing video source frames of a television (TV) program, and more particularly, to such processing dynamically and under control of an algorithm stored within a video processing system.

2. Related Art

If a television (TV) user switches on a TV after an initial portion of a TV program has already elapsed, the user may decide to watch the remainder of the TV program, but without knowledge of the initial portion of the TV program and without knowledge of whether he or she is likely to enjoy watching the remainder of the TV program. Thus, a method and system is needed to help such a TV user to decide whether to watch the remainder of the TV program.

SUMMARY OF THE INVENTION

The present invention provides a method for processing video source frames, comprising:

providing a video processing system (VPS) that includes a processor, a memory structure, and a video input device, wherein the processor is coupled to the memory structure and to the video input device;

inputting video source frames from a video source into the VPS through the video input device;

executing the video source frames, by the processor;

dynamically and non-contiguously extracting key frames from the video source frames during the executing, said extracting implemented in accordance with a frame extraction algorithm that is stored in the memory structure and executed by the processor;

storing the extracted key frames in a first memory of the memory structure; and terminating extracting key frames, prior to completion of said executing of the video source frames.

The present invention provides a system for processing video frames, comprising:

a video frame extraction algorithm that dynamically and non-contiguously extracts key frames from the video source frames during execution of the video source frames;

a processor that executes the video source frames and executes the video frame extraction algorithm;

a video input device that receives the video source frames from a video source, wherein the video input device is coupled to the processor;

a memory structure coupled to the processor, wherein the memory structure stores the video frame extraction algorithm, and wherein a first memory of the memory structure stores the extracted key frames; and a terminating mechanism that terminates extraction of the key frames prior to completion of execution of the video source frames.

The present invention provides a method and structure for helping a television (TV) user to decide whether to watch the remainder of a TV program when the TV user has switched on the TV after an initial portion of the TV program has already elapsed.

DETAILED DESCRIPTION OF THE INVENTION

Figure 1:
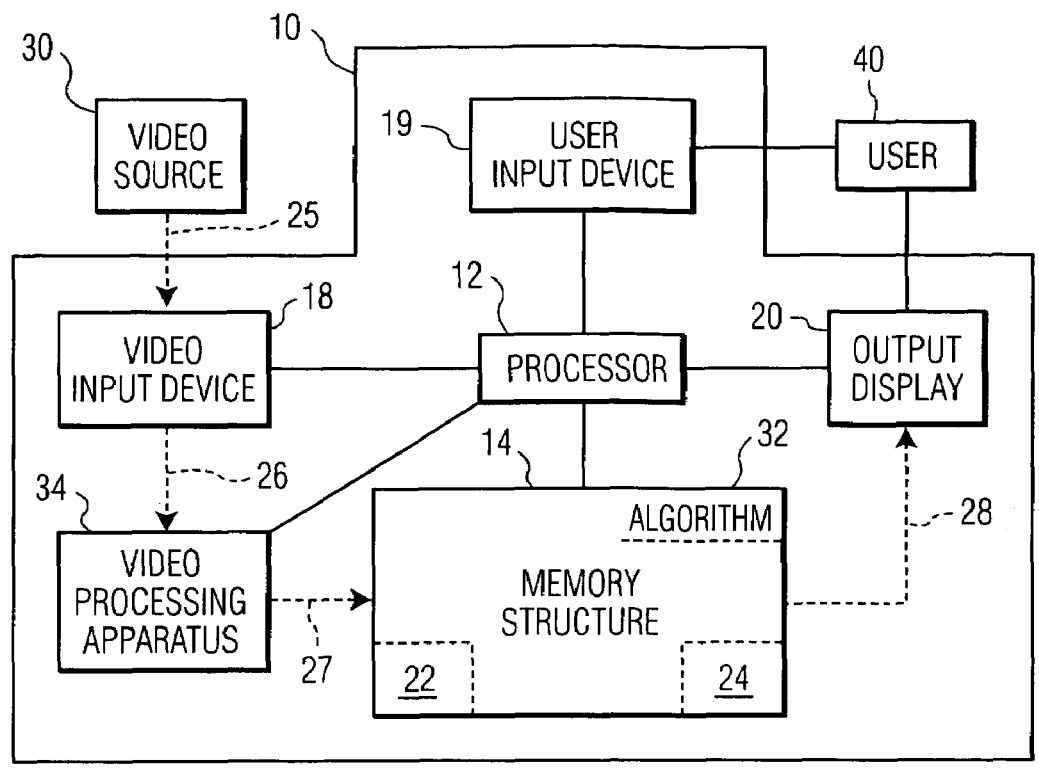
FIG. 1 depicts a block diagram of a video processing system, in accordance with embodiments of the present invention.

FIG. 1 illustrates a block diagram of a video processing system (VPS) 10, in accordance with embodiments of the present invention. The VPS 10 includes a processor 12, a memory structure 14 coupled to the processor 12, a video input device 18 coupled to the processor 12, a user input device 19 coupled to the processor 12, a video processing apparatus 34 coupled to the processor 12, and an output display 20 coupled to the processor 12. The system 10 may represent a computer system (e.g., desktop, laptop, palm-type computer system), a set-top box with a television (TV), etc.

The memory structure 14 includes one or more memory devices or areas therein (e.g., memory device or area 22 or 24), which may include temporary memory, permanent memory, and removable memory. Data stored in temporary memory disappears when electrical power to the VPS 10 is disabled. Temporary memory may include, inter alia, random access memory (RAM). Data stored in permanent memory persists when electrical power to the VPS 10 is disabled. Permanent memory may include, inter alia, hard disk memory, optical storage memory, etc. Removable memory may be easily removed from the VPS 10. Removable memory may include, inter alia, a floppy disk or a magnetic tape.

The video input device 18 is one or more video input devices (e.g., antenna, satellite dish, etc.) for receiving video signals and video frames therein. The user input device 19 is one or more user input devices, which may include, inter alia, a remote control, keyboard, mouse, etc. The output display 20 includes any display such as a TV display, a computer monitor, etc., that can display content that is included in a video frame (i.e., one or more video frames). The output display 20 may be capable of displaying all content (visual, audio, text, etc.), or a portion thereof (e.g., visual content only, audio content only, text content only, etc.).

FIG. 1 shows a video source 30, which is one or more sources of video programs. The video source 30 is a source of a video program receivable by the VPS 10 through a communication medium or path 25 (e.g., television cable lines). The video source 30 may include, inter alia, a television (TV) broadcasting system, a TV satellite system, an Internet web site, a local device (e.g., VHS tape player, DVD player), etc. While embodiments of the present invention are directed to TV programs, the scope of the present invention includes any video program (i.e., any program sequence of video frames) that may be communicated to a user from the video source 30 through the VPS 10. Thus, the video source 30 may also include an Internet web site that broadcasts a video program over the Internet, wherein such Internet-broadcasted program may be received by the VPS 10 through any communication medium or path 25 that is technologically available (e.g., telephone lines, TV cable lines, etc.).

FIG. 1 also shows a user 40, who may communicate with the VPS 10 through the user input device 19 and the output display 20.

In FIG. 1, video source frames (e.g., a TV program) are transferred from the video source 30 to a video input device 18 of the VPS 10 through the communication medium or path 25. An aspect of the present invention is extracting a subset of frames, called key frames, from the aforementioned video source frames, as illustrated in FIG. 2.

Figure 2:
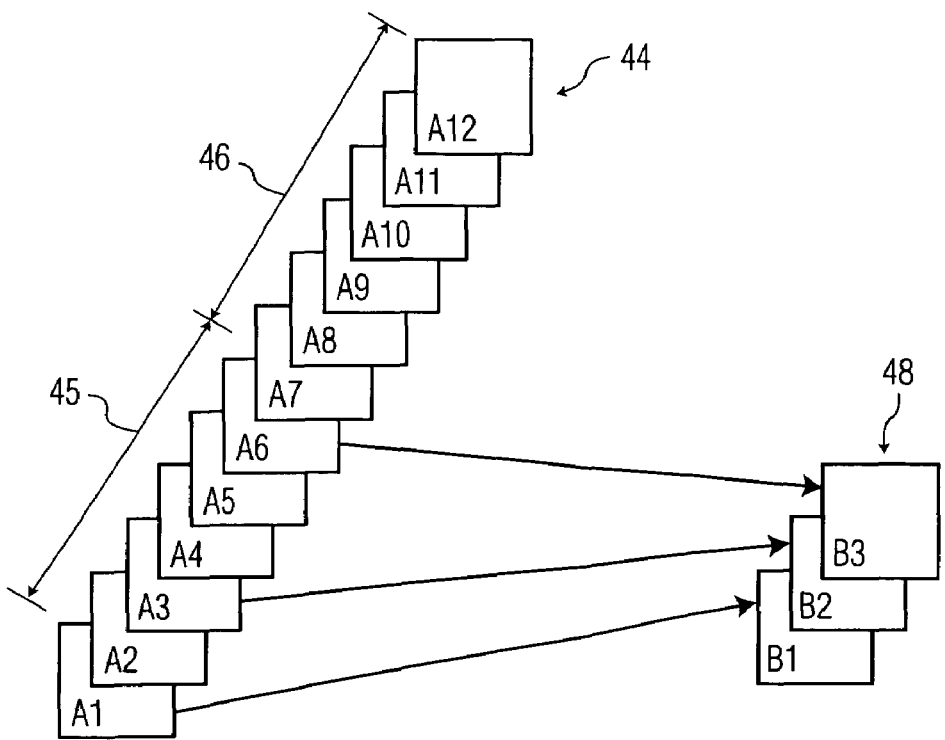
FIG. 2 depicts key frame extraction, in accordance with embodiments of the present invention.

FIG. 2 illustrates key frame extraction, in accordance with embodiments of the present invention. In FIG. 2 the video source frames 44 (denoted as A1, A2, ..., A12) are processed in a manner that forms the key frames 48 (denoted as B1, B2, B3). The key frames 48 constitute less than all of the video source frames 44 in two respects. In the first respect, only an initial portion 45 (i.e., frames A1, A2, ..., A6) of the video source frames 44 are subject to extraction for generating the key frames 48, leaving a remaining portion 46 (i.e., frames A7, A8, ..., A12) of the video source frames 44 that is not subject to the possibility of extraction. The frame extraction methodology or mechanism was actually stopped or disabled upon completion of processing the frame A6. In the second respect, the key frames 48 of B1, B2, and B3 are non-contiguously extracted from the initial portion 45 of the video source frames 44. Non-contiguous extraction means that not all of the frames in the initial portion 45 are extracted; i.e., at least one frame in the initial portion 45 is not extracted in forming the key frames 48. Due to the second respect, a subsequent playing back of the key frames 48 takes less time than did the real-time playing of the initial portion 45.

The key frames 48 may be beneficially used for the following situation in which the TV user 40 (see FIG. 1) switches on a TV after an initial portion of a TV program has already elapsed. If the key frames 48, as extracted from the initial portion 45 of the video source frames 44 of the TV program, have been generated in real time while the initial portion 45 of the TV program was executing (i.e., elapsing), then the user may subsequently review (e.g., play back) the key frames 48 to decide whether to watch the remainder 46 of the TV program. Since the key frames 48 are being used only transiently, the key frames 48 may be stored in temporary memory (e.g., in RAM) and erased as soon as the key frames 48 are no longer needed (e.g., after the key frames 48 have been reviewed). Hence, the key frames 48 do not represent a material burden on the storage capacity of the VPS system 10 (see FIG. 1).

Returning to FIG. 1 and as stated supra, the video source frames are transferred from the video source 30 to a video input device 18 of the VPS 10 through the communication medium or path 25. As the video source frames are moving into the VPS system 10 and being processed by, or under control of, the processor 12, the video source frames are said to be "executed" in real time by the processor 12. The video source frames pass through a video path 26 into a video processing apparatus 34, and then into the memory structure 14 through the video path 27. The video processing apparatus 34 performs whatever hardware processing on the video source frames is necessary for extracting key frames from the video source frames.

The extraction of key frames is implemented in accordance with a frame extraction algorithm 32 that is stored in the memory structure 14. The frame extraction algorithm 32 determines which frames of the video source frames to extract, and may comprise, inter alia, any frame extraction method known to one of ordinary skill in the art. An example of a content-based frame extraction method are scene detection keyframe methods that are disclosed in U.S. Pat. No. 6,137,544 (Dimitrova et al., Oct. 24, 2000), hereby incorporated by reference in its entirety. U.S. Pat. No. 6,137,544 discloses four scene detection keyframe methods, namely Method One (col. 5, line 27-col. 6, line 31), Method Two (col. 6, line 32-col. 7, line 22), Method 3 (col. 7, line 23-col. 8, line 18), and Method Four (col. 8, line 19-col. 9, line 43). Generally, the frame extraction algorithm 32 may comprise any method that determines which frames of the video source frames to extract. Content-independent frame extraction methods may also be used; e.g., extracting odd-numbered frames only (i.e., frames numbered 1, 3, 5, ...). The frame extraction algorithm 32 may be part of a software package that is executed by the processor 12 and may be stored in, inter alia, a RAM within the memory structure 14. Alternatively, the frame extraction algorithm 32 may be encoded in hardware such as on, inter alia, a read only memory (ROM) chip. Note that the specifics of the frame extraction algorithm 32 determines whether the video processing apparatus 34 is required, since the frame extraction algorithm 32 may not require that the video source frames be subject to hardware processing and may require only that the video source frames be passed from the input device 26 to the memory structure 14.

The key frames are being generated as the video source frames are being dynamically executed in real time. Dynamic extraction means extraction in real time as the video source frames are executing. The key frames are stored in the memory structure 14 and may be stored in temporary memory (e.g., RAM), permanent memory (e.g., hard disk memory), or removable memory (e.g., floppy disk or magnetic tape memory). An advantage of storing the key frames in RAM is that data accessing with RAM is faster than with permanent memory. Also, permanent memory storage of the key frames is not needed if the key frames are being used transiently such that they will be erased shortly after they are generated. Additionally, the permanent memory may be full such that the temporary memory is the only memory available for additional data storage. An advantage of storing the key frames in permanent memory is that there may not be enough RAM available to store the key frames, because of other applications being concurrently run by the processor wherein the other applications have RAM-intensive requirements. Also, for those key frames which need to be retained for later usage, permanent memory will allow the key frames to exist even after power to the VPS 10 is turned off. An advantage of storing the key frames in removable memory is that the key frames may be easily saved for later usage, if desired, without impacting the memory resources of RAM, hard disk, etc.

With typical usage of the present invention, the key frame extraction will be terminated prior to completion of execution of the video source frames. For example, if the video source frames relate to a 60-minute TV program, the user 40 may turn the TV on after 15 minutes has elapsed and then review the key frames in order to decide whether to watch the remaining 45 minutes of the TV program. Since it may take one or two minutes to review the key frames, less then 45 minutes of the TV program will remain for the user to subsequently watch, which leaves a time gap that will be addressed in conjunction with a discussion infra of FIG. 3.

The user 40 may take action to terminate the key frame extraction such as by, inter alia, manipulating the user input device 19. For example if the user input device 19 is a remote control device, then pressing of a button of the remote control device could be used to trigger termination of the key frame extracting. Alternatively, the extraction algorithm 32 could include a capability of terminating the key frame extracting when a predetermined condition occurs. There are many examples of predetermined conditions that could be used for terminating the key frame extracting. A first example includes execution of a predetermined time duration from the beginning of execution of the video source frames (e.g., execution of the first 5 minutes of a 30-minutes TV program). A second example includes execution of a predetermined fraction or percentage or number of the video source frames (e.g., execution of 0.20 or 20% or frame number 100 of 2000 frames, respectively, of the video source frames, which corresponds to the first 6 minutes of a 30-minute TV program). The preceding examples illustrate situations in which the user 40 anticipates being unable to watch an initial portion of the TV program, but is able to estimate about when he or she will be able to turn on the TV to watch the remaining portion of the TV program. The VPS 10 could also include a bell or buzzer that is caused to ring by the algorithm 32 when the predetermined condition occurs, in order to alert the user 40 that it is timely for the user 40 to begin reviewing the key frames.

After the key frame extracting is terminated, the algorithm 32 may note where in the sequence of video source frames the key frame extracting was terminated (i.e., an indication of the video source frame being executed when the key frame extracting was terminated). Then this indication (e.g., a specific frame number of the video source frame numbers) could be recorded by, inter alia, generating a special key frame that includes this indication, and appending the special key frame to the extracted key frames that exist in the memory structure 14. If the video source frames are being recorded and saved by the VPS 10, then recording this indication enables the user 40 to determine where the unextracted remaining portion of the video source frames begins. This determination by the user 40 make it easy for the user 40 to view at a later time the key frames and the remaining portion of the video source frames in sequential combination.

For user-review purposes, the extracted key frames are reviewable through the output display 20, which may be, inter alia, a TV display or a computer monitor. "Reviewable" means capable of having visual, audio, and textual frame content, or portions thereof (e.g., visual content only, audio content only, textual content only, etc.) of the extracted key frames available for review. The extracted key frames are moved (e.g., copied) from the memory structure 14 to the output display 20. The user 40 reviews the key frames through the output display 20 dynamically in real time, and thus decides whether to watch the remainder of the TV program; i.e., the remaining video source frames that flow into the VPS 10 after the user 40 completes his or her review of the key frames. See, e.g., the remaining portion 46 of video source frames 44 in FIG. 2, discussed supra.

In FIG. 1, if the user 40 has no further use of the key frames, then the key frames may be erased. Thus, the user 40 may activate erasing the key frames such as by, inter alia, manipulating the user input device 19. For example if the user input device 19 is a remote control device, then pressing of a button of the remote control device could be used to trigger erasing the key frames. Alternatively, the extraction algorithm 32 could include a capability of erasing the key frames when a predetermined condition occurs. The are many examples of predetermined conditions that could be used for erasing the key frames. A first example includes an elapse of a predetermined amount of time following the reviewing of the key frames by the user 40 (e.g., 2 minutes following the reviewing). The first example assumes that there is no need to retain the key frames after being reviewed, but still allows the user a time buffer (e.g., the 2 minutes) in which to decide to go back and initiate a second review of the key frames. A second example includes completion of execution of the video source frames, under the assumption that the user 40 cannot be sure that he or she will not need to again review the key frames after the TV program has ended. Of course, the user 40 may decide not to erase the key frames or may decide to save the key frames for future usage. If the user 40 desires to save the key frames for future usage and if the key frames are stored in temporary memory (e.g., RAM) or permanent memory (e.g., hard disk memory), then the user 40 may effectuate copying the key frames to a removable memory (e.g., floppy disk memory or magnetic tape). After being copied to the removable memory, the key frames in temporary memory or permanent memory may be erased.

Figure 3:
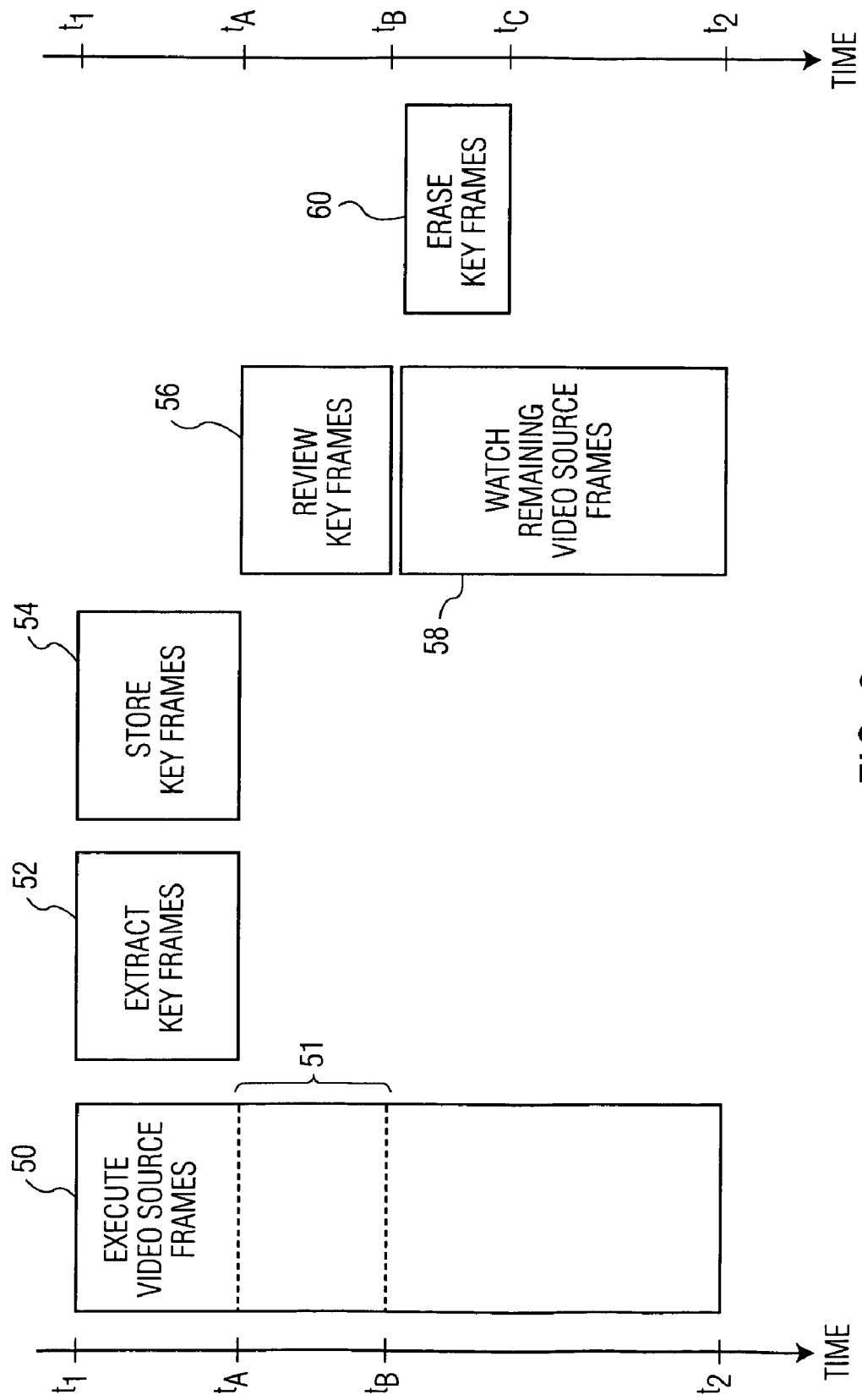
FIG. 3 depicts a real time domain for execution of video source frames coupled with extracting, storing, and erasing of the associated key frames, in accordance with embodiments of the present invention.

FIG. 3 illustrates a real time domain for execution of video source frames, coupled with extracting, storing, and erasing of the associated key frames, in accordance with embodiments of the present invention. In FIG. 3, a step 50 of executing video source frames occurs from time $t_1$ to time $t_2$, wherein $t_1 < t_2$. A step 52 of extracting key frames from the video source frames occurs from time $t_1$ to time $t_A$, wherein $t_1 < t_A < t_2$. Thus, extracting key frames 52 occurs dynamically (and non-contiguously, as explained supra) during the real-time execution 50 of the video source frames. Termination of the extracting key frames 52 at the time $t_A$ may be by any of the methods discussed supra. A step 54 of storing the extracted key frames in the memory structure 14 (see FIG. 1) occurs in parallel with the step 52 of extracting key frames; i.e., from time $t_1$ to time $t_A$. A step 56 of reviewing the extracted key frames by the user 40 (see FIG. 1) may begin at or after $t_A$ as shown in FIG. 3 and end at time $t_B$, wherein $t_A < t_B < t_2$. After reviewing the extracted key frames, the user 40 (see FIG. 1) may elect to engage in a step 58 of watching the remaining video source frames from time $t_W$ to time $t_2$, wherein $t_B \leq t_W < t_2$.

The preceding time sequences leave a time gap 51 (from time $t_A$ to time $t_B$) during which video frames are executing but are not seen by the user 40, because the extracting step 52 was terminated at time $t_A$ and the reviewing step 56 is occurring during the time gap 51. A solution to this difficulty is terminating the extracting step 52 at time $t_B$ rather than at time $t_A$, such that the reviewing step 56 is occurring while the extracting step 52 is still being executed and the reviewing step 56 is thus occurring prior to termination of the extracting step 52. This solution enables the extracted key frames reviewed by the user 40 (see FIG. 1) to encompass about all of the video source frames that precede those video source frames watched in the step 58.

An advantage of the present invention is that the extracted key frames will typically be no longer needed after being reviewed and may thus be erased, which releases space in the memory structure 14 (see FIG. 1) that the extracted key frames occupied. Accordingly, a step 60 of erasing the extracted key frames may be initiated when the reviewing step 56 ends, or soon thereafter; i.e., at a time $t_E$, wherein $t_E \geq t_B$. The erasing step 60 terminates at time $t_C$. A time duration for erasing, namely $t_C - t_E$, is very short in comparison with other time scales discussed herein (e.g.; the extracting time duration or the reviewing time duration). In isolated applications, the user 40 (see FIG. 1) may elect to retain the extracted frames for use after the video source frames have been completely executed. In such isolated applications, the erasing step 60 may be executed after the time $t_2$ of completion of execution of the video source frames.

While the discussion supra focused on one set of video source frames corresponding to, one TV program, the scope of the present invention generally includes simultaneously processing one or more of such sets of video source frames. Such simultaneous processing of N video source frames, with N >1, includes dynamically and non-contiguously extracting a key frame set corresponding to each of the N sets of video source frames. Such simultaneous processing enables the user 40 (see FIG. 1) to decide as to which, if any, of the N corresponding TV programs to watch after a portion of each of the N programs has elapsed.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A method for processing video source frames within a display device, comprising:
    employing a video processing system (VPS) as part of the display device that includes a processor, a memory structure, and a video input device, wherein the processor is coupled to the memory structure and to the video input device;
    inputting video source frames from a video source into the VPS through the video input device;
    executing the video source frames, by the processor;
    dynamically and non-contiguously extracting key frames from the video source frames during the executing, said extracting implemented in accordance with a frame extraction algorithm that is stored in the memory structure and executed by the processor,
    storing the extracted key frames in a first memory of the memory structure; and
    terminating extracting key frames prior to completion of said executing of the video source frames.

2. The method of claim 1, wherein the first memory includes a temporary memory.

3. The method of claim 2, wherein the temporary memory includes a random access memory (RAM).

4. The method of claim 1, wherein the first memory includes a permanent memory.

5. The method of claim 4, wherein the permanent memory includes hard disk memory.

6. The method of claim 1, further comprising recording in the first memory an indication of a video source frame being executed when the terminating occurred.

7. The method of claim 6, wherein recording in the first memory comprises generating a special key frame that includes the indication, and further comprising appending the special key frame to the extracted key frames in the first memory.

8. The method of claim 1, wherein the terminating is triggered by action of a user of the VPS.

9. The method of claim 8, wherein the action includes a manipulating by the user of a user input device.

10. The method of claim 1, wherein the terminating occurs at a time when a predetermined condition has occurred.

11. The method of claim 10, wherein the predetermined condition includes execution of a predetermined fraction or percentage of the video source frames.

12. The method of claim 10, wherein the predetermined condition includes execution of a predetermined number of video source frames.

13. The method of claim 10, wherein the predetermined condition includes an elapsing of predetermined time duration from initiation of executing the video source frames.

14. The method of claim 1, further comprising reviewing the key frames by a user of the VPS, wherein the reviewing occurs through an output display that is coupled to the processor.

15. The method of claim 14, wherein the output display includes a television screen or a computer monitor.

16. The method of claim 14, wherein the reviewing occurs prior to completion of executing the video source frames.

17. The method of claim 16, wherein the reviewing occurs at or after the terminating.

18. The method of claim 16, wherein the reviewing occurs prior to the terminating.

19. The method of claim 14, wherein the reviewing occurs at or after completion of executing the video source frames.

20. The method of claim 14, further comprising at or after completion of the reviewing, erasing the key frames from the first memory.

21. The method of claim 20, wherein the erasing is triggered by action of the user.

22. The method of claim 21, wherein the action includes a manipulating by the user of a user input device.

23. The method of claim 20, wherein the erasing occurs at a time when a predetermined condition has occurred.

24. The method of claim 23, wherein the predetermined condition includes completion of the executing of the video source frames.

25. The method of claim 23, wherein the predetermined condition includes an elapse of a predetermined amount of time following the reviewing.

26. The method of claim 14, further comprising after completion of the reviewing, copying the key frames from the first memory to a second memory of the memory structure, wherein the second memory includes a removable memory.

27. The method of claim 26, further comprising after completion of the copying, erasing the key frames from the first memory.

28. The method of claim 1, wherein the video frame extraction algorithm comprises a content-based method of video frame extraction.

29. The method of claim 28, wherein the content-based method includes a keyframe scene detection method selected from the group consisting of a Method One keyframe scene detection method, a Method Two keyframe scene detection method, a Method Three keyframe scene detection method, and a Method Four keyframe scene detection method.

30. The method of claim 1, wherein the video frame extraction algorithm comprises a content-independent method of video frame extraction.

31. A display system for processing video frames, comprising:
    a video frame extraction algorithm within the display system that dynamically and non-contiguously extracts key frames from the video source frames during execution of the video source frames;
    a processor within the display system that executes the video source frames and executes the video frame extraction algorithm;
    a video input device within the display system that receives the video source frames from a video source, wherein the video input device is coupled to the processor;
    a memory structure within the display system that is coupled to the processor, wherein the memory structure stores the video frame extraction algorithm, and wherein a first memory of the memory structure stores the extracted key frames; and
    a terminating mechanism within the display system that terminates extraction of the key frames prior to completion of execution of the video source frames.

32. The system of claim 31, wherein the first memory includes a temporary memory.

33. The system of claim 32, wherein the temporary memory includes a random access memory (RAM).

34. The system of claim 31, wherein the first memory includes a permanent memory.

35. The system of claim 34, wherein the permanent memory includes hard disk memory.

36. The system of claim 31, further comprising a recording mechanism that records in the first memory an indication of a video source frame being executed when the extraction of key frames is terminated.

37. The system of claim 36, wherein the receiving mechanism records the indication in a special key frame that is appended to the extracted key frames.

38. The system of claim 31, wherein The terminating mechanism includes a user-controlled device.

39. The system of claim 38, wherein the user-controlled device includes a user input device that is coupled to the processor.

40. The system of claim 31, wherein the terminating mechanism terminates the extracting at a time when a predetermined condition has occurred.

41. The system of claim 40, wherein the predetermined condition includes execution of a predetermined fraction or percentage of the video source frames.

42. The system of claim 40, wherein the predetermined condition includes execution of a predetermined number of video source frames.

43. The system of claim 40, wherein the predetermined condition includes an elapsing of predetermined time duration from initiation of the execution of the video source frames.

44. The system of claim 31, further comprising an output display through which a user may review the extracted key frames, wherein the output display is coupled to the processor.

45. The system of claim 44, wherein the output display includes a television screen or a computer monitor.

46. The system of claim 44, wherein the system permits review of the key frames prior to completion of execution of the video source frames.

47. The system of claim 46, wherein the system permits review of to key frames when or after the terminating mechanism terminates extracting the key frames.

48. The system of claim 46, wherein the system permits review of the key frames before the terminating mechanism terminates extracting the key frames.

49. The system of claim 44, wherein the system permits receive of the key frames upon or after completion of execution of the video source flames.

50. The system of claim 44, further comprising an erasing mechanism that erases the key frames from the first memory at or after completion of review of the key frames by the user.

51. The system of claim 50, wherein the erasing mechanism is triggered by action of the user.

52. The system of claim 51, further comprising a user input device, wherein the action includes the user manipulation of the user input device.

53. The system of claim 50, wherein the erasing mechanism is triggered when a predetermined condition has occurred.

54. The system of claim 53, wherein the predetermined condition includes completion of execution of the video source frames.

55. The system of claim 53, wherein the predetermined condition includes an elapse of a predetermined amount of time following the review of the key frames.

56. The system of claim 31, further comprising a second memory of the memory structure and a transferring mechanism, wherein the transferring mechanism transfers the key frames from the first memory to the second memory, and wherein the second memory includes a removable memory.

57. The system of claim 56, further comprising an erasing mechanism that erases the key frames from the first memory after the transferring mechanism completes transfer of the keyframes from the first memory to the second memory.

58. The system of claim 31, wherein the video frame extraction algorithm comprises a content-based method of video frame extraction.

59. The system of claim 58, wherein the content-based method includes a keyframe scene detection method selected from the group consisting of a Method One keyframe scene detection method, a Method Two keyframe scene detection method, a Method Three keyframe scene detection method, and a Method Four keyframe scene detection method.

60. The system of claim 31, wherein the video frame extraction algorithm comprises a content-independent method of video frame extraction.

* * * * *